UNITED STATES PATENT OFFICE.

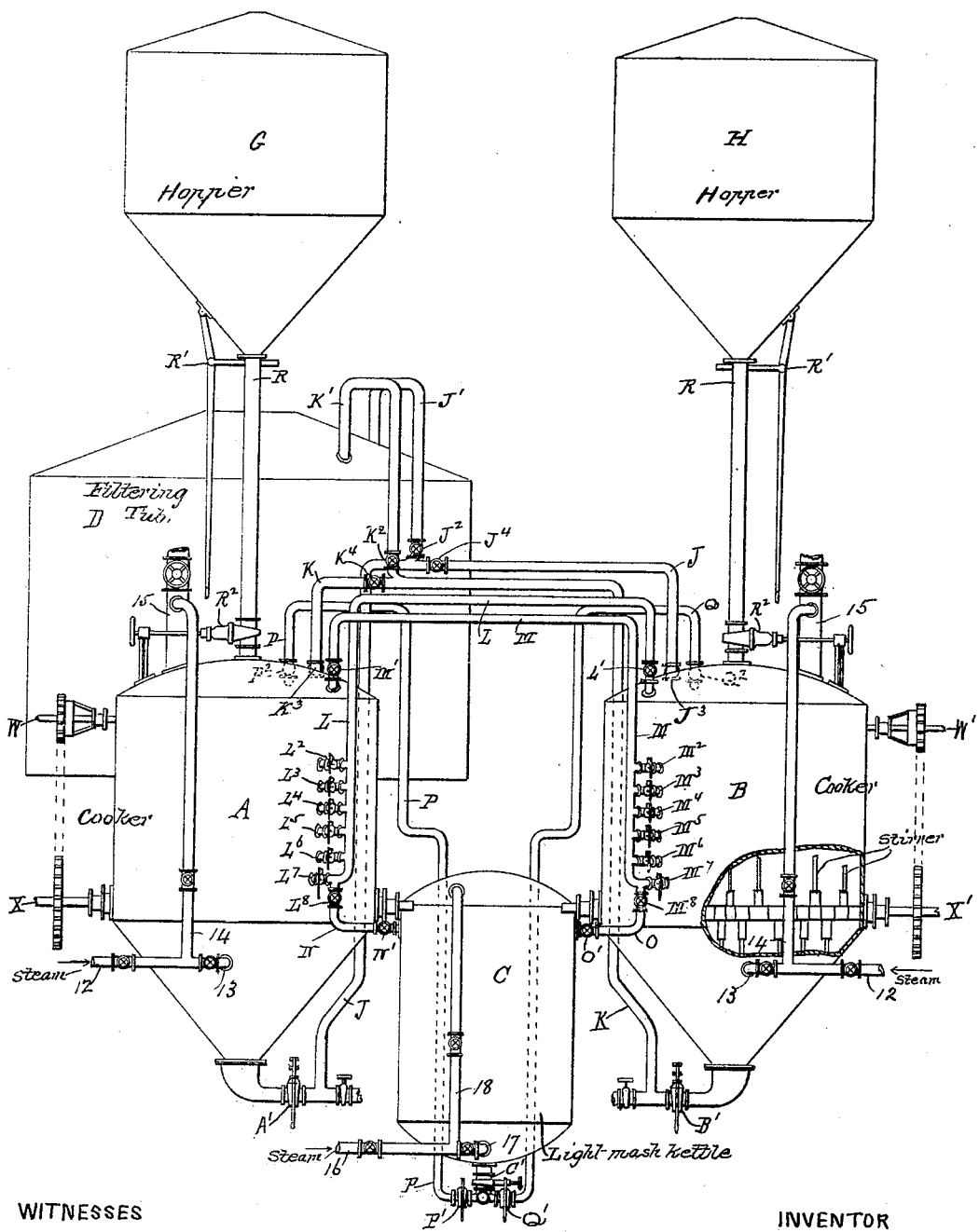

CARL RACH, OF NEW YORK, N. Y.

BREWING APPARATUS.

No. 804,979.      Specification of Letters Patent.      Patented Nov. 21, 1905.

Application filed October 26, 1904. Serial No. 230,077.

*To all whom it may concern:*

Be it known that I, CARL RACH, a subject of the King of Prussia, German Emperor, residing in the borough of Manhattan, in the city, county, and State of New York, have invented an Improved Brewing Apparatus, of which the following is a specification.

My present invention has reference more particularly to the construction of that part of brewing apparatus which has to do with the mashing portion of the process.

The object of my invention is to so construct the apparatus as to facilitate the mashing, the heating of the mash, its transfer from one vessel to another, and the separating of the thick mash from the thin mash, or, as it is commonly termed, "lautermash."

My apparatus has been constructed particularly to permit any one of the several well-known brewing processes to be carried out—as, for example, the American mashing process or upward-infusion process, the English or downward-infusion process, the German or decoction process, and the mashing process for which a patent has been granted to me in the United States, No. 460,989, dated October 13, 1891.

The diagram in the accompanying drawing illustrates my improved apparatus.

A and B are two cookers which are represented as vessels of the same size, but may be of different sizes, and either one may be used as a cooker proper or as a mash-tub. Each of these vessels A and B is provided with suitable internal stirring appliances driven from external shafts, as indicated at W W' and X X', and each of these vessels may be provided with suitable heating means.

I have at 12 indicated a valved steam-supply pipe with valved continuation 13 leading into the lower part of the vessel, either for the direct admission of steam or to a jacket or coils, as may be preferred. A branch 14 leads into the valved escape-pipe 15 for admitting pressure to the interior of the vessel at the upper part when desired.

C is a kettle for the light mash or, as it may be termed, the "diastase kettle," which may also be provided with stirring and heating and pressure-producing means, such as the pipes 16, 17, and 18, similar to the pipes 12, 13, and 14.

At D, I have indicated a filtering-tub which may be constructed like the ordinary filtering-tubs or mash and filtering tubs used in breweries.

G and H are two hoppers which may be filled with malt or malt and unmalted cereals. From the bottom of each hopper leads a pipe R, with a lever-controlled gate-valve R' and a lower valve $R^2$ for the delivery of the malt or malt and unmalted cereals into the corresponding cooker A or B.

The lower part of the vessel A is connected to the upper end of the vessel B by a pipe J, the bottom of the vessel A, to which the pipe J is connected, being provided with a valve A'. The pipe J has valves at $J^3$ $J^4$ and also has an upwardly-extending branch J' leading to the filtering-tub D and provided with a valve $J^2$. Similarly the lower part of the vessel B is connected through a pipe K with the upper end of the vessel A, the lower end of B having a valve B'. The pipe K has valves at $K^3$ and $K^4$, and it also has an upwardly-extending branch K' leading to the filtering-tub D, and this branch has a valve $K^2$. The upper end of the vessel A may also be put in communication with the bottom of the kettle C through a pipe P, which has at its upper end a valve $P^2$ and at its lower end a valve P'. Similarly the upper end of the vessel B may be put into communication with the lower end of the kettle C through a pipe Q, which has a valve $Q^2$ and a valve Q'. I prefer to provide an additional valve C' in the neck at the bottom of the kettle C, to which the pipes P and Q are connected.

In the side wall of the cooker A, I provide a set of valved connections $L^2$ $L^3$ $L^4$, &c., in communication with a pipe L, leading to the upper part of the cooker B, where is provided a valve L'. A branch N, with a valve $L^8$ and a valve N', may be used to form connection between any or all of the valved connections $L^2$ $L^3$ $L^4$, &c., and the kettle C. Similarly the vessel B is provided with a series of valved connections $M^2$ $M^3$ $M^4$, &c., at different levels leading to a pipe M in communication through the valve M' with the upper part of the cooker A. There is a connection O with valves $M^8$ and O' between the valved connections $M^2$ $M^3$, &c., and the upper part of the kettle C.

I will now describe how my apparatus as constructed may be employed in carrying out any of a number of different mashing processes, and specifically I briefly explain how the apparatus may be employed in carrying out the American, English, and German processes, as well as the process of my Patent No. 460,989.

*1. The American or upward-infusion mashing process.*—In the hopper G, I collect the malt, while in the hopper H, I collect the unmalted grain and the portion of the malt I wish to mash with the unmalted grain, all this material being in a crushed form. I supply to the vessel A the required water, and while operating the stirring devices in that vessel I run the malt through the pipe R into the vessel, and I turn on the steam and get the temperature I wish—say 28° Réaumur, (95° Fahrenheit.) Then I stop the motion of the stirring devices and let the mash in the vessel A rest. Meantime I put water in the vessel B, start the stirring devices, run in the malt and unmalted cereals from the hopper H, and turn on the steam in the vessel B. I raise the temperature in this mash in the vessel B gradually to the boiling-point, and I boil the mash either at atmospheric pressure or at a pressure of from twenty to thirty pounds to the square inch. When this mash is gelatinized, I establish a temperature of from 80° to 85° Réaumur (212° to 224° Fahrenheit) in the raw-cereal-malt mash in the vessel B, and then I open the valve B' at the bottom and apply steam or other suitable fluid pressure to the upper part of the vessel B—as, for instance, through 12 and 14—so as to force the mash from the vessel B through the pipe K into the vessel A, the valves K³ and K⁴ being opened while the valve K² is closed. While the mash is forced from the vessel B into the malt mash in the vessel A, the stirring devices in the latter are in operation. The higher temperature of the mash from the vessel B raises the temperature of the mash in the vessel A gradually until the mashing-off temperature of 58° to 60° Réaumur (163° to 167° Fahrenheit) is reached. The mashing is then continued until all the starch is converted in the vessel A, and when this point is reached all the mash is forced by steam or other fluid pressure out of the vessel A through the opened valve A' and pipe J into the filtering-tub D, the valve J² being opened and the valve J⁴ closed for the purpose. From the filtering-tub D the clear wort may be run off and treated in the usual manner.

*2. The English or downward-infusion process.*—The malt is mashed in the vessel A, as described with reference to the previous process; but instead of taking water of ordinary temperature I take water which is several degrees above the mashing-off temperature, so that when the malt and water are mixed by the stirring devices in the vessel A the mashing-off temperature of 58° Réaumur (163° Fahrenheit) is reached. Meantime the raw-cereal-malt mash is prepared in the vessel B, and after this mash has been boiled and gelatinized I cool it off in the vessel B to the mashing-off temperature. When this is obtained, I force the raw-cereal-malt mash from the vessel B into the vessel A through the pipe K, taking care that the temperature of about 58° Réaumur (163° Fahrenheit) is maintained. When all the mash has been collected in the vessel A, I shut off all connection between B and A, and I connect the vessel A with the filtering-tub D through the piping J J', and by steam or other fluid pressure on the upper part of the vessel A, I force all the mash from the latter into the filtering-tub, from which the clear wort is run off thereafter.

*3. The German or decoction process.*—In this process malt only is used, as a rule. I prepare the malt mash in the vessel A, running the malt from the hopper G into the said vessel while the stirring devices are put in operation. In the vessel B, I prepare boiling water and then force that boiling water over into the vessel A through the piping K, the proper valves being opened for the purpose, and I bring the temperature of the malt mash in the vessel A to 28° Réaumur, (95° Fahrenheit.) I stir the malt mash in this vessel thoroughly, so as to get all the diastase in solution. When this stage has been reached, the stirring devices are put out of operation. The thick and solid part of the mash (the thick mash) sinks to the bottom of the vessel A, while the liquid part or light mash stands in the upper part. I now open the valves in the connections L² L³, &c., leaving the valve A' closed, however. I then put steam or other fluid pressure on the top of the mash in the vessel A, so as to force the liquid part or light mash off from the vessel A into the vessel B through the pipe L, the valve L' having also been opened for the purpose. I then boil the thick mash in the vessel A, and when all the starch therein is gelatinized I force the thick mash from the vessel A into the light mash in the vessel B, the valves A', J³, and J⁴ being opened and the valve J² closed and the stirring devices in the vessel B being put in operation. When the two mashes are combined, I make the temperature of the mash in the vessel B about 42° Réaumur. The same process is repeated, bringing the light mash in the vessel B into the vessel A through pipe M, boiling the thick mash in B, and when this is accomplished forcing the thick mash through the pipe K into the vessel A by opening the valves B', K³, and K⁴, the valve K² being closed. When the two mashes are thus combined in the vessel A again, I secure a temperature therein of about 52° Réaumur, (149° Fahrenheit.) While the mashing operation is going on in the vessel A, the stirring devices therein are kept in motion. When the desired temperature has been reached, the motion of the stirring devices is stopped and the thick mash is allowed to settle, after which the light mash is forced off through the pipe L into the vessel B again. This light mash in the vessel B is now gradually heated to the boiling-point, while the stirring devices therein are kept in operation. After the boiling-point is reached the light mash is forced back from the vessel B into the vessel A through the pipe M, and I raise the temperature of the collected mashes in the vessel A to 60° Réaumur, (167° Fahrenheit.) The mashing operation is continued until all the starch is converted and changed into extract of the wort, and thereupon the entire mash is forced from the vessel A into the vessel D through the pipe J, the valves A' and J² being opened, while the valve J⁴ is closed.

*4. The process of my Patent No. 460,989.—* In carrying out the process of this patent in my present improved apparatus I mash the malt in the vessel A in water of about 28° Réaumur, (95° Fahrenheit,) and I continue the mashing until all the soluble diastase is in solution, the stirring devices being in operation. When all the disatase has been dissolved, the motion of the stirring devices is stopped, and the thick part of the mash is allowed to settle. I then open the valve N' and also the valves L² L³, &c., to and including L⁸, and I run the thin part of the mash into the kettle C through the pipe N. When this is done, I close the valves N' and L² to L⁸. I start the stirring devices in the vessel A into operation, and I raise the temperature of the thick mash therein to the boiling-point. In the meantime I have prepared the raw-cereal-malt mash in the vessel B, running malt and unmalted cereals from the hopper into that vessel while operating the stirring devices, and a proper quantity of water of 35° Réaumur (110° Fahrenheit) having been supplied to that vessel. I turn steam into the vessel B and raise the temperature therein gradually to the boiling-point and then to any heat above the boiling-point in order to completely gelatinize the mash therein. When this has been accomplished, the mash is forced from the vessel B into the vessel A through the pipe K, the valves B', K³, and K⁴ being opened for the purpose. The entire mash is now collected in the vessel A, where I provide a temperature of 80° Réaumur, (212° Fahrenheit.) Then I force about half of the light mash out of the kettle C into the vessel A through the pipe P by opening the valves C', P', and P², the valve Q' being closed. I keep the stirring appliances in the vessel A in motion, mixing the light mash of about 28° Réaumur (95° Fahrenheit) with the thick mash, bringing down the temperature of the latter from about 80° Réaumur, (212° Fahrenheit) to 60° Réaumur, (167° Fahrenheit.) The mashing is continued until all the starch is changed into extract of wort, and then I heat the remainder of the light mash in C to the boiling-point and then force it from the kettle C through pipe P into the vessel A, wherein I bring the temperature gradually to 65° Réaumur, (179° Fahrenheit.) Then I close valve J⁴ and open the valves A' J² and force all the mash from the vessel A into the filtering-tub D, from which the clear wort is afterward drawn, as usual.

It will be seen from the foregoing explanation that the apparatus described provides the best facilities for carrying out many different brewing processes and modifications thereof, and particularly for mashing under many different conditions, heating the mashes, transferring them from one vessel to another, and for separating and recombining the thick and thin mashes. Either of the twin cooking vessels can be used as a cooker or as a mash-tub, and the mashes can be brought to any desired temperature in either vessel or both.

I claim as my invention—

1. In a brewing apparatus, two vessels, provided with heating means and pressure-applying means, in combination with two valved pipes each connecting the bottom of one vessel with the top of the other.

2. In a brewing apparatus, two vessels provided with heating means and pressure-applying means, in combination with a filtering-tub, two valved pipes, each connecting the bottom of one said vessel with the top of the other said vessel, and a valved branch from each said pipe to the filtering-tub.

3. In a brewing apparatus, two vessels provided with heating means and pressure-applying means, in combination with two pipes, each having a series of valved branches at different levels connecting the body of one vessel with the top of the other vessel.

4. In a brewing apparatus, two vessels and a diastase-kettle each provided with heating means and pressure-applying means, in combination with two pipes, each having a series of valved branches connecting the body of one said vessel with the top of the other said vessel, and also with the top of said kettle, together with valved pipes connecting the bottom of the kettle with the tops of the two said vessels.

In testimony whereof I have signed my name to this specification in the presence of two subscribing witnesses.

CARL RACH.

Witnesses:
 HUBERT HOWSON,
 F. WARREN WRIGHT.